United States Patent
Flanary

(10) Patent No.: US 8,643,231 B2
(45) Date of Patent: Feb. 4, 2014

(54) WATER-RESISTANT ELECTRIC MOTOR

(75) Inventor: Ron Flanary, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 409 days.

(21) Appl. No.: 12/782,645

(22) Filed: May 18, 2010

(65) Prior Publication Data
US 2011/0120073 A1    May 26, 2011

Related U.S. Application Data

(60) Provisional application No. 61/179,318, filed on May 18, 2009.

(51) Int. Cl.
*H02K 5/10* (2006.01)
*H02K 15/12* (2006.01)
*A01D 75/08* (2006.01)

(52) U.S. Cl.
USPC ............. 310/43; 310/88; 310/89; 310/71; 310/412; 29/596; 56/250

(58) Field of Classification Search
USPC ................ 310/43, 45, 87, 88, 89, 177, 412, 310/DIG. 6, 413, 416; 264/272.19, 272.2
See application file for complete search history.

(56) References Cited

U.S. PATENT DOCUMENTS

| | | | |
|---|---|---|---|
| 527,927 A | 10/1894 | Bassett | |
| 1,954,579 A | 4/1934 | Smith | |
| 2,857,109 A | 10/1958 | Haeussler | |
| 3,085,513 A | 4/1963 | Zimmermann | |
| 3,216,034 A | 11/1965 | Johnson | |
| 3,886,616 A | 6/1975 | Hayes | |
| 4,128,527 A * | 12/1978 | Kinjo et al. | 310/43 |
| 4,167,830 A | 9/1979 | Ogawa | |
| 4,177,021 A | 12/1979 | Niedermeyer | |
| 4,387,313 A * | 6/1983 | Yamamoto et al. | 310/71 |
| 4,518,886 A * | 5/1985 | Kaneyuki | 310/71 |
| 4,720,638 A | 1/1988 | Vollbrecht | |

(Continued)

FOREIGN PATENT DOCUMENTS

| | | | | |
|---|---|---|---|---|
| EP | 1672972 A1 * | 6/2006 | | |
| JP | 03128640 A * | 5/1991 | | H02K 11/00 |
| JP | 11356006 A * | 12/1999 | | H02K 5/22 |
| WO | WO 2007139129 A1 * | 12/2007 | | H02K 11/00 |

OTHER PUBLICATIONS

Ono et al, JP11356006A Machine Translation, Dec. 1999.*

*Primary Examiner* — Burton Mullins
*Assistant Examiner* — Eric Johnson
(74) *Attorney, Agent, or Firm* — Hodgson Russ LLP

(57) ABSTRACT

Embodiments of the invention provide a water resistant electric motor and method of assembly. The motor includes a housing with a main body having a rear endbell, a stator compartment with stator windings, and a first ball bearing. The motor includes a lid having a second ball bearing, and a rotor with a shaft having a first end positioned in the first ball bearing and a second end positioned in the second ball bearing. An epoxy coating is used to overmold the stator compartment, the stator windings, and the rotor. The motor includes a printed circuit board assembly treated with an adhesion promotor and positioned adjacent to the rotor and stator windings. A silicone sealant is used to encapsulate the printed circuit board assembly, the rotor, and the stator windings and reacts with the adhesion promotor. The motor includes a gasket between the lid and the main body.

29 Claims, 2 Drawing Sheets

(56) References Cited

U.S. PATENT DOCUMENTS

| | | |
|---|---|---|
| 4,727,168 A | 2/1988 | Yoshino et al. |
| 4,843,998 A | 7/1989 | Parker |
| 5,095,612 A | 3/1992 | McAvena |
| 5,304,880 A | 4/1994 | Hisada et al. |
| 5,394,043 A * | 2/1995 | Hsia .................................. 310/90 |
| 5,532,533 A * | 7/1996 | Mizutani ...................... 310/68 B |
| 6,040,647 A | 3/2000 | Brown et al. |
| 6,069,421 A * | 5/2000 | Smith et al. ...................... 310/43 |
| 6,081,056 A * | 6/2000 | Takagi et al. .................... 310/89 |
| 6,183,208 B1 | 2/2001 | Qandil et al. |
| 6,481,378 B1 | 11/2002 | Zemach |
| 6,700,253 B1 * | 3/2004 | Ohnuma et al. ................. 310/89 |
| 7,061,146 B2 * | 6/2006 | Hirt et al. ........................ 310/43 |
| 7,786,635 B2 * | 8/2010 | Gasser et al. .................... 310/89 |
| 2006/0196159 A1 * | 9/2006 | Daly et al. .......................... 56/7 |
| 2008/0184688 A1 | 8/2008 | Daly et al. |
| 2010/0019629 A1 * | 1/2010 | Amaya et al. ................ 310/68 R |

* cited by examiner

WATER-RESISTANT ELECTRIC MOTOR

RELATED APPLICATIONS

This application claims priority under 35 U.S.C. §119 to U.S. Provisional Patent Application No. 61/179,318 filed on May 18, 2009, the entire contents of which is incorporated herein by reference.

BACKGROUND

Walk-behind lawn mowers typically use hydraulic motors to rotate a reel including cutting blades. Golf courses are regularly watered and fertilized to maintain the lawn in a superior condition. Due to these wet and harsh chemical conditions, lawn mowers with hydraulically-powered blades are used to cut the lawn on golf courses. However, hydraulically-powered blades can only be driven at a fixed speed, which can result in an inferior cut quality. Hydraulic motors are also prone to leaking hydraulic fluid, which can ruin portions of the lawn. This can be problematic on golf courses, especially while cutting putting greens.

SUMMARY

Some embodiments of the invention provide a water resistant electric motor, which can be used, for example, to rotate the reel of a walk-behind lawn mower. The electric motor includes a housing with a main body and a lid. The main body includes a rear endbell, a stator compartment with stator windings, and a first ball bearing. The lid includes a second ball bearing. The electric motor includes a rotor with a shaft having a first end positioned in the first ball bearing and a second end positioned in the second ball bearing. An epoxy coating is used to overmold the stator compartment, the stator windings, and the rotor. The electric motor includes a printed circuit board assembly treated with an adhesion promotor and positioned adjacent to the rotor and stator windings. A silicone sealant is used to encapsulate the printed circuit board assembly, the rotor, and the stator windings. The silicone sealant reacts with the adhesion promotor. The electric motor includes a gasket between the lid and the main body in order to seal the stator compartment.

DETAILED DESCRIPTION

Figure 2:
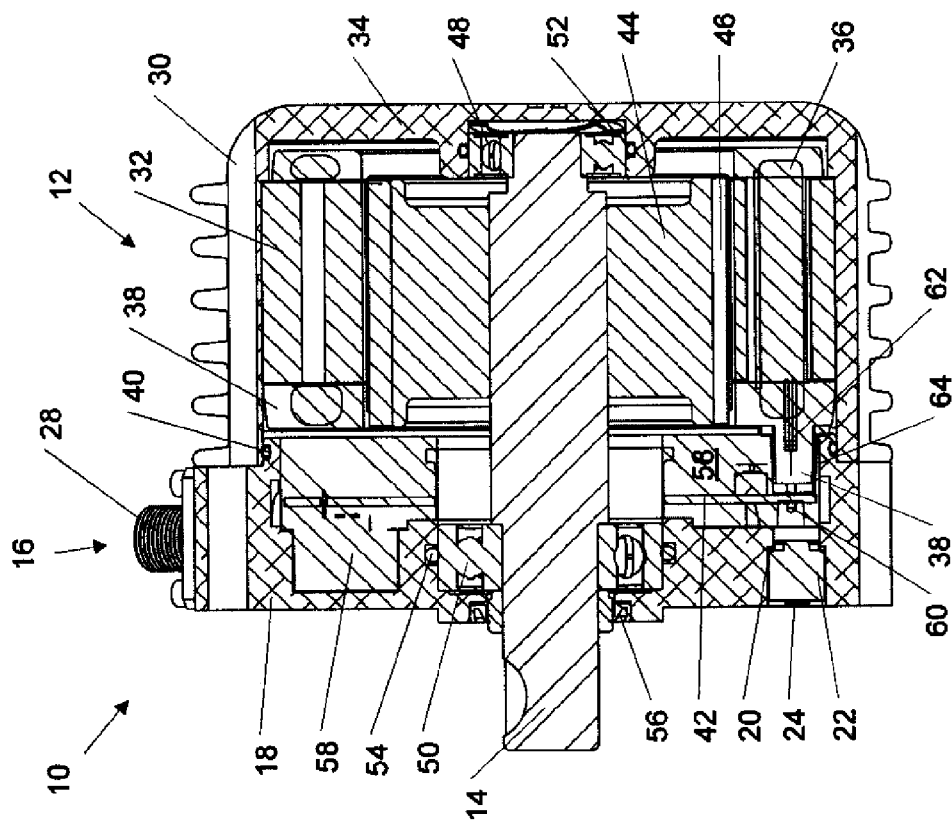
FIG. 2 is a cross-sectional view of the electric motor of FIG. 1 taken along line 2-2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
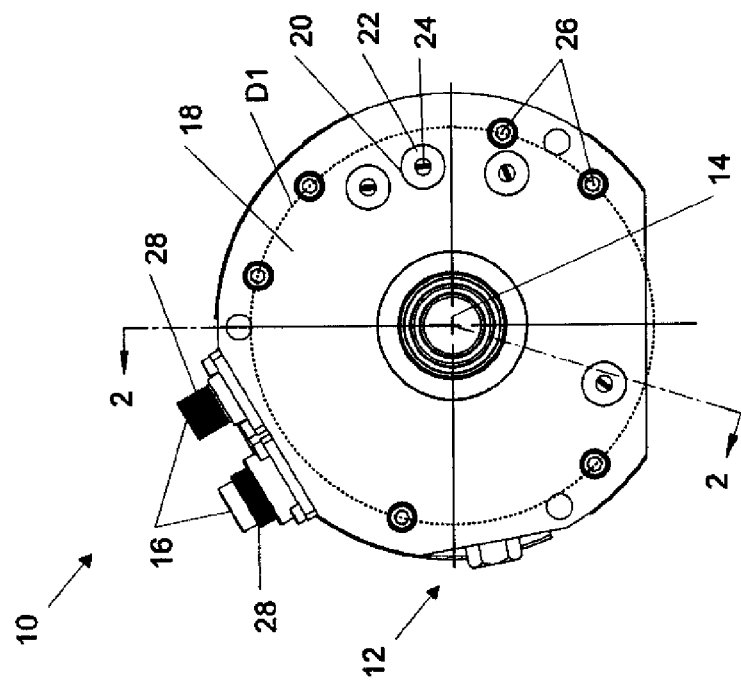
FIG. 1 is a side view of an electric motor according to one embodiment of the invention.

FIG. 1 illustrates an electric motor 10 according to one embodiment of the invention. The electric motor 10 can include a housing 12, a shaft 14, and an electrical connector 16. The housing 12 can include a lid 18. In some embodiments, the lid 18 can include a through hole 20, and the through hole 20 can be sealed with a plug 22. A screw 24 can deform the plug 22 to force the plug 22 to engage with the through hole 20 forming a water-tight seal. The plug 22 can form a high-pressure seal. In some embodiments, the plug 22 can be made from metal. The lid 18 can also include additional screws 26 to couple the lid 18 to the housing 12. In some embodiments, the additional screws 26 can be generally aligned along a diameter D1. The electrical connector 16 can be used to provide power to the electric motor 10. The electrical connector 16 can be positioned on an outer perimeter of the lid 18. The electrical connector 16 can include a threaded post 28 allowing cables with suitable connectors to form a hermetically-sealed connection.

FIG. 2 illustrates a cross-sectional view of the electric motor 10 according to one embodiment of the invention. The housing 12 can include the lid 18, a main body 30, a stator compartment 32, and a rear endbell 34. In some embodiments, the housing 12 can integrally form the stator compartment 32 and the endbell 34 to reduce the number of seals and gaskets necessary to make the motor 10 waterproof. The stator compartment 32 can enclose stator windings 36. In some embodiments, the stator windings 36 can include a solenoid.

In some embodiments, the housing 12 can include a coating 38 that can cover the inside and the outside of the housing 12. For example, the housing 12 and the stator compartment 32 can be overmolded with the coating 38. The coating 38 can include epoxy and/or other suitable materials. The coating 38 can be chemically resistant to fertilizers and other chemicals.

The lid 18 can be coupled to the main body 30 and can be sealed with a gasket 40. In some embodiments, the diameter of the gasket 40 can be substantially smaller than the diameter D1 (as shown in FIG. 1). As a result, the gasket 40 can prevent fluid from entering the electric motor 10 through the additional screws 26. In some embodiments, the additional screws 26 do not need to be individually sealed without compromising the sealing characteristics of the electric motor 10.

In some embodiments, the lid 18 can be coupled to a printed circuit board assembly (PCA) 42 including a controller (e.g., a microprocessor) and other necessary electronic components. In some embodiments, the controller of the PCA 42 can adjust the speed of the electric motor 10. The electrical connector 16 can be connected to the PCA 42.

As shown in FIG. 2, the shaft 14 can include a rotor 44. In some embodiments, the shaft 14 and the rotor 44 can be integral components. In some embodiments, a permanent magnet 46 can be positioned on an outer end of the rotor 44. In some embodiments, the shaft 14 and/or the rotor 44 can be overmolded. The shaft 14 can be coupled to the housing 12 by a first ball bearing 48 and a second ball bearing 50, allowing the shaft 14 to rotate with respect to the housing 12. The first ball bearing 48 can be positioned in the endbell 34 and the second ball bearing 50 can be positioned in the lid 18.

The first ball bearing 48 and the second ball bearing 50 can be sealed. In some embodiments, a first O-ring 52 can be positioned around an outer diameter of the first ball bearing 48 and a second O-ring 54 can be positioned around an outer diameter of the second ball bearing 50. The first O-ring 52 and the second O-ring 54 can be used as additional measures to seal the electric motor 10. The first O-ring 52 and the second O-ring 54 can also help dampen vibrations of the electric motor 10. As a result, the first O-ring 52 and the second O-ring 54 can reduce the noise of the electric motor 10 during operation.

Figure 3:
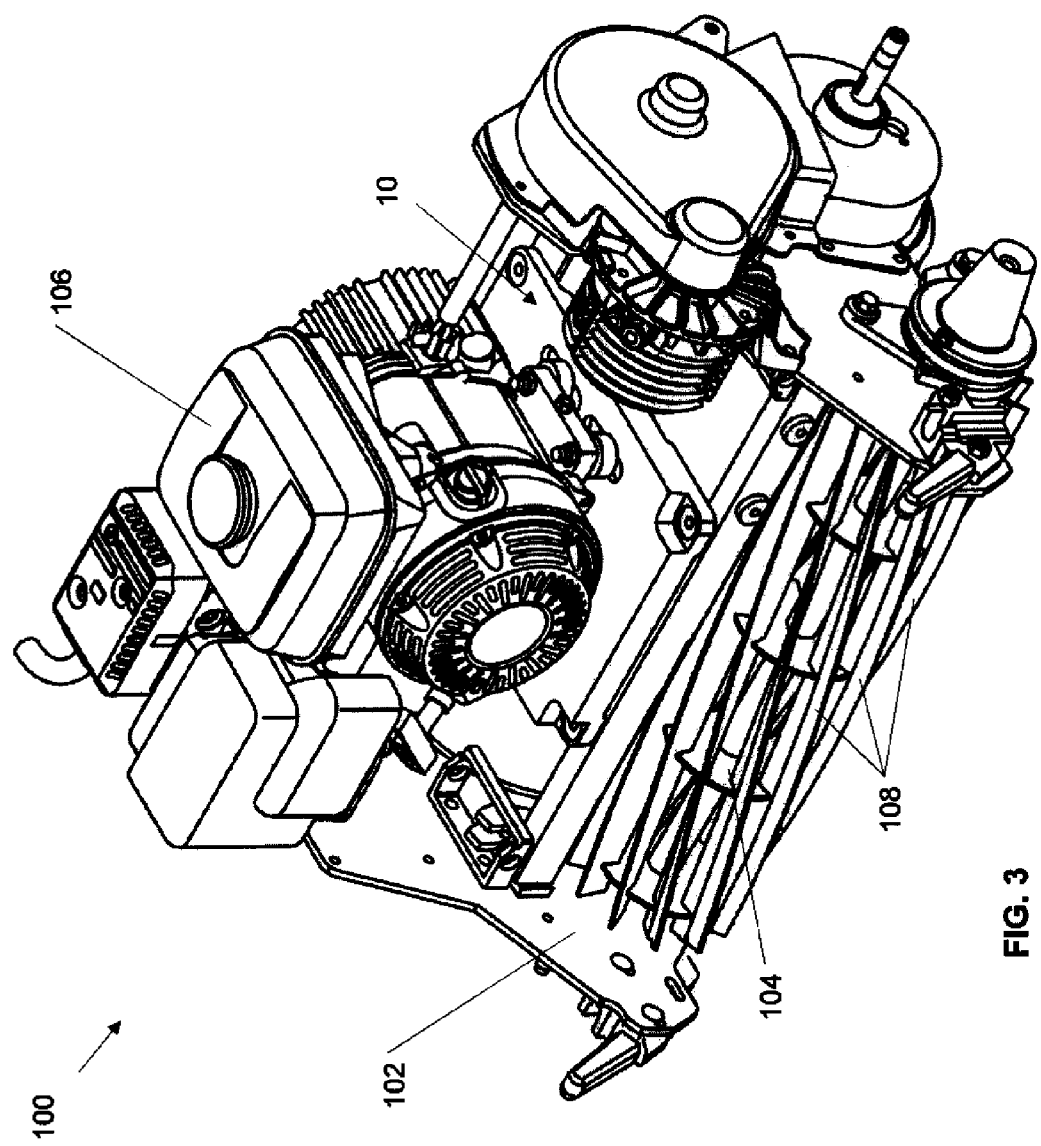
FIG. 3 is a perspective view of the electric motor being used in a walk-behind mower according to one embodiment of the invention.

The shaft 14 can extend beyond the lid 18 to connect to a peripheral device, such as a reel of a walk-behind mower (as shown and described with respect to FIG. 3). A water-tight seal 56 can be positioned between the shaft 14 and the lid 18, without obstructing the rotational movement of the shaft 14.

In some embodiments, the PCA 42 can be encapsulated in a sealant 58. The sealant 58 can include silicone and/or other suitable materials. In some embodiments, the PCA 42 can be pre-treated, for example, with an adhesion promoter, to help provide an uninterrupted seal. In some embodiments, a pin 60 can connect the PCA 42 to wiring 62 of the stator windings 36. The pin 60 and/or the wiring 62 can be routed through a passage 64. The passage 64 can be formed through the sealant 58. The passage 64 can align with the through hole 20 of the lid 18. The through hole 20 can be used to couple the pin 60 and/or the wiring 62 to the PCA 42 during assembly of the electric motor 10. Once the wiring 62 is positioned in the through hole 20, the plug 22 can be inserted to make the through hole 20 substantially waterproof. The coating 38 can at least partially cover the wiring 62 so that the coating 38 can merge with the sealant 58 to form a water-tight seal in the passage 64. The pin 60 can be coupled to the wiring 62 and can extend beyond the coating 38.

To assemble the electric motor 10, according to some embodiments of the invention, the stator windings 36 and the wiring 62 can be inserted into the main body 30. The main body 30 can then be overmolded with the coating 38. The pin 60 attached to the wiring 62 can remain substantially uncovered by the coating 38. The first ball bearing 48 and the second ball bearing 50 can be coupled to the shaft 14 by a press fit. The first O-ring 52 can be inserted in the rear endbell 34 and the shaft 14 can be coupled to the main body 30. The PCA 42 can be coupled to the lid 18 and can be encapsulated by the sealant 58. The gasket 40, the second O-ring 54, and the seal 56 can be attached to the lid 18. The sealant 58 can merge with the coating 38 of the wiring 62 to form a waterproof connection. The lid 18 can then be coupled to the main body 30 by the additional screws 26. The pin 60 can be soldered to the PCA 42 via the through hole 20. The through hole 20 can then be sealed with the plug 22. In this manner, the electric motor 10 can be a waterproof, sealed unit that cannot be easily disassembled.

The electric motor 10 is highly water resistant due to its packaging and sealing. The electric motor 10 uses hermetic connectors which attach to the PCA 42. The PCA 42 and the back side of the connectors can be encapsulated in silicone sealant 58. The areas that are sealed in the silicone sealant 58 can be first coated with adhesion promoter to make sure the silicone seals all areas. The stator compartment 32 and stator windings 36 can be overmolded in a transfer molding machine with epoxy. The PCA 42 can be mated with the stator compartment 32 and the stator windings 36 and the applicable connections (e.g., solder joints) can be made through holes 20 in the front endbell (e.g., the lid 18). The gasket 40 can be positioned between the stator windings 36 and PCA 42 to seal the interface. The holes 20 through which the stator windings 36 and PCA 42 are soldered together can then be filled with sealing plugs 22 (e.g., Lee Company Plugs or Avseal Plugs). As a result, the electric motor 10 is an extremely compact design that is highly resistant to water intrusion.

Since silicone (on the PCA 42) and transfer mold material (on the stator windings 36) consume the majority of space in the electric motor 10 (which would normally be consumed with air), there is very little air trapped inside the electric motor 10. As the electric motor 10 heats and cools, pressure will build up inside the electric motor 10 (due to the thermal coefficient of expansion of air), as long as the electric motor 10 does not leak. The most likely leak point is the shaft seal 56, since it is a wear component. However, since there is very little air in the electric motor 10 to begin with, there will be only a small amount of outside air transferred in the event the shaft seal 56 begins leaking. This means only a small amount of moisture would be introduced into the electric motor 10 if the shaft seal 56 leaks.

The electric motor 10 can be highly resistant to fluids and moisture. With the components of the electric motor 10 being encapsulated with either silicone or epoxy and the gasket 40 between the interface of the silicone and epoxy, the electric motor 10 can continue to operate even if it is full of water for an extended period of time. The electric motor 10 can also withstand direct spray from a pressure washer.

FIG. 3 illustrates a lawn mower 100, such as a walk-behind lawn mower, for use with the electric motor 10. The lawn mower 100 can include a frame 102 supporting a reel 104 and an engine 106. The reel 104 can include blades 108. The engine 106 can be used to propel the lawn mower 100 forward, and the electric motor 10 can be used to rotate the reel 104. The controller of the PCA 42 can control the speed of the reel 104 in proportion to the speed at which the lawn mower 100 is being propelled by the engine 106. In some embodiments, the controller can account for the number of blades 108 on the reel 104 to determine the speed at which the reel 104 should be driven. In some embodiments, the controller can adjust the speed of the reel 104 according to the type of lawn being cut. For example, the reel 104 can be driven at different speeds by the electric motor 10 depending on whether the grass being cut is on a putting green, a fairway, or a rough of a golf course.

In some embodiments, the controller can provide a backlap mode in which the reel 104 can be rotated in reverse to sharpen the blades 108. The microprocessor design allows the electric motor 10 to provide the backlap mode, which allows the user to operate the reel blades 108 in reverse at a controlled reduced speed to sharpen the reel blades 108. The software of the electric motor 10 can restrict the maximum speed of the backlap operation to about 400 RPM, for example, to prevent the user from mistakenly running the reel 104 at a high speed in reverse to sharpen the blades 108.

The controller of the PCA 42 can monitor a temperature and/or power consumption of the electric motor 10 and can indicate a detected fault condition to an operator. Thermal monitoring/power monitoring of the electric motor 10 and current enables the ability to determine if there are any mechanical issues associated with the reel 104 mechanics. The controller of the PCA 42 can detect mechanical problems with the reel 104. For example, it is common for the user of the lawn mower 100 to over tighten the blades 108 against the reel assembly 104. As a result, the reel assembly 104 requires higher than nominal torque levels and the life of the reel assembly 104 is reduced. The controller of the PCA 42 can detect the abnormal power consumption and warn the user and/or shut down the electric motor 10.

In some embodiments, the controller of the PCA 42 can be programmed for specific applications and/or can be updated with additional features. For example, the electric motor 10 can be reprogrammed in the field by removing the front access cover (e.g., the lid 18 or an access cover in the lid 18).

Some embodiments of the invention provide a brushless electric motor 10 with an integrated drive that is designed for outdoor use. In one embodiment, the brushless electric motor 10 can be used as a golf greens mower to replace conventional hydraulic systems. Conventionally, hydraulic motors have been used to perform the reel 104 mowing action. However, the hydraulic motor presents some technical limitations for the reel 104 application, including lack of speed control during mowing or backlapping, poor overall efficiency, and no feedback to the user regarding operating conditions. In addition to the technical limitations, hydraulic systems are always prone to leaking hydraulic fluid. If this fluid happens to leak on a golf green, the leak can cause very significant damage to the greens. By converting the motor from a hydraulic system to a permanent magnet brushless motor, these shortcomings are eliminated. The electric motor 10 can enable the user to precisely control the speed of the reel 104 which in turn provides a superior cut. The electric motor 10 does not leak hydraulic fluid and eliminates the need for a hydraulic pump.

In one embodiment, the electric motor 10 fits within a very limited area on a walk-behind lawn mower 100 in order to avoid contacting the ground (e.g., the outer diameter and the length are limited in size). The electric motor 10 can withstand exposure to harsh chemicals (e.g., fertilizers) and normal outside environments (e.g., high heat, cold, and rain). By being highly water resistant, the electric motor 10 can also withstand being washed with a high pressure hose.

The electric motor 10 has an extremely small overall package size for the amount of torque output delivered. The heat generated by the components in the electric motor 10 is significantly minimized in order to minimize losses, as well as the packaging/assembly process. The electric motor 10 delivers more torque while consuming less energy with an integrated drive. The microprocessor-based design of the electric motor 10 provides the foundation to allow for complex integrated digital control loops to enable tight speed control over the wide operating range. These control loops allow for the electric motor 10 to control the speed of the mowing reels 104 directly proportional to the speed of the electric mower 10, which significantly improves the quality of the cut.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A water resistant electric motor comprising:
a housing including a main body and a lid, the main body including a rear endbell, a stator compartment with stator windings, and a first ball bearing, the lid including a second ball bearing and a through hole;
a pin coupled to wiring of the stator windings;
a rotor including a shaft with a first end positioned in the first ball bearing and a second end positioned in the second ball bearing;
a coating overmolding the stator compartment, the stator windings, and the rotor, the coating at least partially covering the wiring, wherein the pin extends beyond the coating;
a printed circuit board assembly encapsulated with a sealant, the printed circuit board assembly positioned adjacent to the rotor and the stator windings so that the coating merges with the sealant, wherein the sealant includes a first sealant passage and a second sealant passage formed in the sealant on opposite sides of the printed circuit board assembly, and the pin extends through the first sealant passage to reach the printed circuit board assembly;
a removable plug extending completely through the through hole of the lid to make the through hole substantially waterproof, wherein the removable plug seals the second sealant passage; and
a gasket between the lid and the main body in order to seal the stator compartment.

2. The electric motor of claim 1 wherein the rotor includes a permanent magnet and the electric motor is brushless.

3. The electric motor of claim 1 wherein the sealant substantially eliminates air inside the electric motor.

4. The electric motor of claim 1 wherein the shaft is integral with the rotor.

5. The electric motor of claim 1 and further comprising a first O-ring between the first ball bearing and the rear endbell and a second O-ring between the second ball bearing and the lid.

6. The electric motor of claim 1 and further comprising a seal between the second end of the shaft and the lid.

7. The electric motor of claim 1 and further comprising an electrical connector coupled to the lid.

8. The electric motor of claim 1 wherein the stator compartment and the stator windings are overmolded with the coating in a transfer molding machine.

9. The electric motor of claim 1 wherein the printed circuit board assembly includes a microprocessor capable of controlling a speed of the shaft.

10. The electric motor of claim 1 wherein the electric motor is used to drive a reel of a walk-behind mower.

11. The electric motor of claim 9 wherein the microprocessor controls the speed of the shaft that is coupled to a reel of a walk-behind mower.

12. The electric motor of claim 11 wherein the speed is controlled based on a type of lawn being mowed.

13. The electric motor of claim 11 wherein the microprocessor provides a backlap mode in which the reel is rotated in reverse at a restricted speed in order to sharpen blades.

14. The electric motor of claim 9 wherein the microprocessor monitors at least one of temperature and power consumption in order to detect a fault condition.

15. The electric motor of claim 11 wherein the microprocessor controls the speed of the shaft rotating the reel in direct proportion to speed at which the walk-behind mower is being propelled.

16. A method of assembling a water resistant electric motor, the method comprising:
inserting stator windings into a main body of a housing, the main body including a stator compartment and a rear endbell, the rear endbell including a first ball bearing;
coupling a pin to wiring of the stator windings;
inserting a shaft of a rotor into the first ball bearing and into a second ball bearing of a lid of the housing;
overmolding the stator compartment, the stator windings, and the rotor with a coating so that the coating at least partially covers the wiring and the pin extends beyond the coating;
encapsulating a printed circuit board assembly with a sealant;
providing a first sealant passage and a second sealant passage through the sealant on opposite sides of the printed circuit board assembly;
positioning the printed circuit board assembly adjacent to the rotor and stator windings so that the pin extends through the first sealant passage;
coupling the pin to the printed circuit board assembly by accessing the printed circuit board assembly via a through hole of the lid; and
sealing the stator compartment with a gasket between the lid and the main body and sealing the through hole of the lid and the second sealant passage with a removable plug.

17. The method of claim 16 wherein sealing the through hole with the plug includes making the through hole substantially waterproof.

18. The method of claim 16 and further comprising causing the coating to merge with the sealant to form a waterproof seal in the first sealant passage.

19. The method of claim 16 and further comprising substantially eliminating air inside the electric motor with the sealant.

20. The method of claim 16 and further comprising positioning a first O-ring between the first ball bearing and the rear endbell and a second O-ring between the second ball bearing and the lid.

21. The method of claim 16 and further comprising positioning a seal between an end of the shaft and the lid.

22. The method of claim 16 and further comprising overmolding the stator compartment and the stator windings with the coating using a transfer molding machine.

23. The method of claim 16 and further comprising using a microprocessor of the printed circuit board assembly to control a speed of the shaft.

24. The method of claim 16 and further comprising driving a reel of a walk-behind mower with the shaft.

25. The method of claim 23 and further comprising controlling the speed of the shaft that is coupled to a reel of a walk-behind mower.

26. The method of claim 25 and further comprising controlling the speed of the reel based on a type of lawn being mowed.

27. The method of claim 25 and further comprising providing a backlap mode in which the reel is rotated in reverse at a restricted speed in order to sharpen blades.

28. The method of claim 23 and further comprising monitoring at least one of temperature and power consumption in order to detect a fault condition.

29. The method of claim 25 and further comprising controlling the speed of the shaft rotating the reel in direct proportion to a speed at which the walk-behind mower is being propelled.

* * * * *